United States Patent [19]

Scharmer et al.

[11] Patent Number: 4,527,747
[45] Date of Patent: Jul. 9, 1985

[54] METHOD AND VIBRATORY CHUTE FOR TREATING GOODS

[75] Inventors: Wolfgang Scharmer, Darmstadt-Arheilgen; Heinz Saettler, Gerolsheim; Eugen Schlag, Darmstadt, all of Fed. Rep. of Germany

[73] Assignee: Carl Schenck AG, Darmstadt, Fed. Rep. of Germany

[21] Appl. No.: 464,461

[22] Filed: Feb. 7, 1983

[30] Foreign Application Priority Data

Feb. 24, 1982 [DE] Fed. Rep. of Germany ....... 3206544

[51] Int. Cl.³ ............................................. B02C 17/14
[52] U.S. Cl. ........................................ 241/26; 241/38; 241/79; 241/283; 241/284; 241/DIG. 10
[58] Field of Search ............... 366/108, 111, 112, 114, 366/116, 128; 241/DIG. 10, 21, 26, 30, 38, 60, 69, 70, 79, 283, 284; 164/5, 412

[56] References Cited

U.S. PATENT DOCUMENTS 3,053,379 9/1962 Roeder et al. .................... 198/220
4,361,291 11/1982 Ellis et al. ....................... 241/283 X

FOREIGN PATENT DOCUMENTS 2853344 6/1980 Fed. Rep. of Germany .

Primary Examiner—Mark Rosenbaum
Attorney, Agent, or Firm—W. G. Fasse; D. H. Kane, Jr.

[57] ABSTRACT

Manufactured goods such as cast components to which molding sand is still adhering, are treated in a vibratory conveyor chute for cleaning and cooling the goods. As the goods travel down the chute they are exposed to force components extending perpendicularly and across to the travel direction along the length of the chute. These force components impose on the goods a revolving motion along a helical path. This revolving motion may be improved or intensified by directing the resulting force components (R, R') of the force causing the revolving motion to extend at a spacing from a so-called "center of gravity line" (S, S') defining or interconnecting the center of gravity points along the length of the vibratory chute system. This spacing causes a distribution of the goods (11) in the chute such that the goods (11) have a slanted surface (10) in the chute (1). Thus, the vertical acceleration values ($k_v$) are larger at the upper return zone 26 than they are at the lower return zone 27. This type of treatment combined with the conveying movement is applicable to various kinds of goods and treatment procedures.

18 Claims, 10 Drawing Figures

METHOD AND VIBRATORY CHUTE FOR TREATING GOODS

BACKGROUND OF THE INVENTION

The invention relates to a method for treating of goods in a vibrating conveyor chute, especially for cleaning and cooling of cast components to which the molding sand still adheres. In this method vibration or force components are produced which extend substantially perpendicularly and across the main conveying direction along the longitudinal axis of the chute. The invention also relates to a vibrating conveyor chute for performing the present method.

In connection with known devices for treating of goods in a vibrating conveyor chute a type of helically revolving motion is achieved for the goods being treated in the conveyor chute which is excited or rather vibrated substantially in directions perpendicularly and across its longitudinal axis. In such a chute the resultant of the vibration generating force is effective in a plane extending perpendicularly to the longitudinal axis of the chute. However, it is also possible to generate energizing components in the longitudinal direction of the chute, namely, in the main feed advance direction for transporting the goods being treated in the main feed advance direction.

U.S. Pat. No. 3,053,379 (Roeder et al) discloses a material handling vibrating apparatus in which the vibration causing force components extend through the so-called total center of gravity of the apparatus. This type of vibrating or oscillating drive has substantial advantages for conveying and/or screening flowable solid materials. However, there is room for improvement where, in addition to the conveying and screening function, materials must be physically separated from each other, for example where molding sand needs to be separated from cast components.

German Patent Publication (DE-OS) 2,853,344 (Scharmer) laid open on June 19, 1980 discloses a vibratory chute for cleaning and cooling cast components to which mold sand is still adhering. In this prior art chute, which has a circular or semi-circular cross-section, the vibration generating force components are directed perpendicularly to and across the feed advance direction. The resultant force component extends through the center of the chute and hence is not most effective for its intended purpose of separating the mold sand from the cast components.

OBJECTS OF THE INVENTION

In view of the above it is the aim of the invention to achieve the following objects singly or in combination:

to vibrate goods in such a way that different components of the goods may be separated from each other even if these components initially adhere to one another, for example sand adhering to cast components;

to increase the effectiveness of vibrating conveyor chutes for their intended purpose;

to provide a vibrating conveyor chute in which the vibration generating force components or rather the resultant of these force components is so directed that the operating conditions of the chute are taken into account, such operating conditions including, for example the type of material or materials being treated, the required or desired conveying speed and so forth; and to cause the goods in the chute to follow a flow pattern as determined by the size and direction of said force components.

SUMMARY OF THE INVENTION

It has been found that the revolving movement or the intensity of the movement in the conveyor chute may be substantially improved if the effective direction of the resultant of the energizing or vibration generating force is so selected that it extends with a spacing from a center of gravity line of the conveying system. This center of gravity line generally is a line which interconnects all the gravity centers of cross-sectional planes extending perpendicularly to the fixed central, longitudinal axis of the chute. The center of gravity line may shift its position depending on the load in the chute and on the movement of the load in the chute. The invention takes this into account, whereby it is, for example, possible to generate by means of linear vibration generators an especially practical and advantageous motion of the goods being treated in the conveyor chute.

In the system of the invention higher vertical accelerations, so-called $k_v$-values, are achieved in the upper zone of the flow of goods through the chute than in the lower chute zone. Thus, the goods being treated are influenced especially advantageously in each zone of the chute. In this connection the $k_v$-value is the ratio of the vertical chute acceleration component to gravity.

The effective direction of the resultant of the vibration generating force components is suitably adapted to the respective operating conditions including the type of the treatment and/or to the type of the goods to be treated. The filling degree of the chute is advantageously selected to be within the range of 10 to 50% by volumne of the chute.

The vibration generators and/or the connecting elements for these generators are so constructed in a vibrating conveyor chute of the invention for performing the method according to the invention that the effective direction of the resultant of the vibration generating force components has a spacing to a center of gravity line of the conveyor system lying in the longitudinal direction of the chute. As a practical matter the vibration generator and/or energizing weights are arranged in a position adjustable manner so that the effective direction of the energizing or generating force components is variable. An electrical adjustment of the effective direction is also possible, for example, with the aid of autosynchronizing circular exciters.

Vibration exciters suitable for the present purposes are disclosed in the above mentioned U.S. Pat. No. 3,053,379 and may be purchased as standard shelf items from Carl Schenck AG, D-6100 Darmstadt 1, Federal Republic of Germany.

It has been further found to be practical to arrange a baffle means either rigidly or adjustably at the end of the conveyor chute or upstream, as viewed in the feed advance direction, of a screen section incorporated into the conveyor chute. This feature maintains the distribution of the goods in the chute cross-section of the conveyor chute over the length of the chute. The upper edge of the baffle means may in this embodiment suitably be constructed in accordance with the slope of the surface of the layer of the goods.

Further advantageous embodiments are achieved in that the baffle means are equipped with a flange extending in the feed advance direction or in that the baffle means are constructed in steps extending opposite to the feed advance direction whereby the risers face toward the input end of the conveyor chute which may have a semi-circular, a circular, a tubular, or an angular cross-section or it may have a polygonal cross-section. Further, the conveyor chute may be arranged horizontally in the feed advance direction or it may have a positive or negative slant in the feed advance direction.

It has been found that the method and vibrating conveyor chute according to the invention are well suitable for cooling and cleaning of cast components to which molding sand is still adhering. Especially larger chute constructions having a chute radius larger than about 0.5 m are suitable for this purpose. The method and the vibrating conveyor chute according to the invention are suitable for a large number of industrial processing and treatment procedures, such as mixing, separating, cleaning, heating, drying, cooling, and similar operations.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
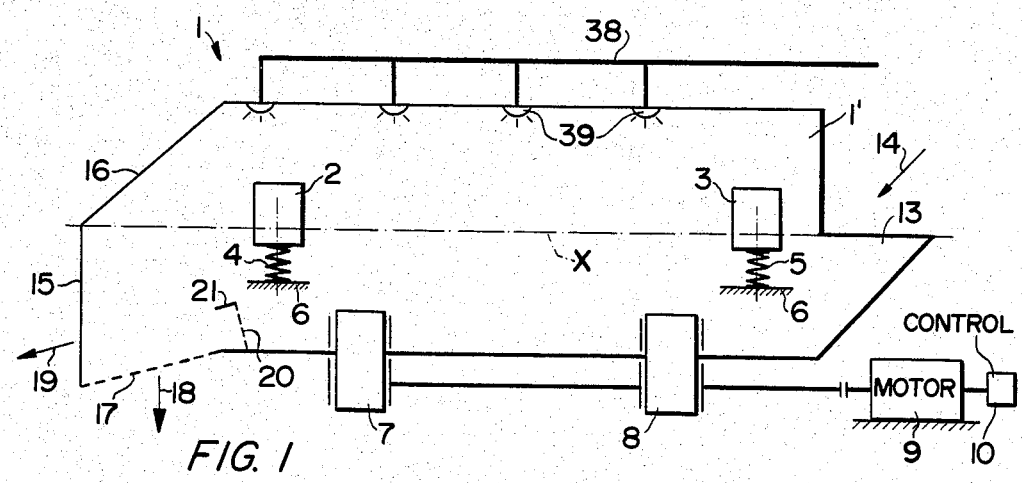
FIG. 1 is a side view of the entire structure of a vibrating conveyor chute operable according to the invention.
Figure 2:
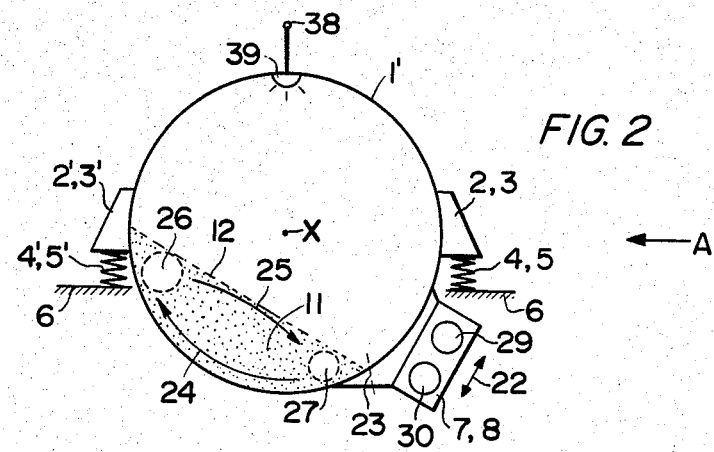
FIG. 2 is a sectional view through a tubular vibrating conveyor chute with the vibration generator mounted thereto and showing the material moving pattern achieved by the invention.

FIG. 1 shows a side view of a vibratable tubular conveyor chute 1 in a much simplified form. FIG. 1 is a view in the direction of the arrow A in FIG. 2 showing a sectional view through such a chute. The tubular chute 1 is supported by support bearings or brackets 2, 3 and springs 4, 5 on a foundation 6 or on a frame. The conveyor chute 1 is driven by two vibration generators 7 and 8 and by means of a driving mechanism such as a motor 9 controllable by control means 10 of the type disclosed in the above mentioned U.S. Pat. No. 3,053,379.

Support brackets 2', 3' and springs 4', 5' are also arranged on the opposite side as shown in FIG. 2. Control means 10 provide for electrically adjusting the effective direction of the vibration generating force components. Linear vibration energizers or directional vibration energizers are preferably used for this purpose. The vibration energizers or generators 7, 8 produce vibrations or force components perpendicularly and across the main feed advance direction. Stated differently, these vibration or force components extend perpendicularly or across the longitudinal chute axis "x". As a result, a non-symmetric distribution of the goods 11 is achieved in the chute 1 as best seen in FIG. 2, whereby the surface 12 of the goods 11 extends at a slant to the horizontal. The layer of goods 11 or rather the distribution of the goods in the chute is shown in FIG. 2.

The chute of FIG. 1 is equipped with an input 13 forming a hopper type inlet into which the goods 11 are charged in the direction of the arrow 14. The chute 1 is further equipped with an outlet 15 which may have a slanting top portion 16 and a slanting bottom portion in the form of a screen 17 through which one component of the goods such as sand may be discharged as indicated by the arrow 18.

Other good components such as cast components may be discharged through the outlet 15 as indicated by the arrow 19. A baffle means 20 may be arranged just upstream of the outlet screen 17. The baffle means 20 may have a top flange 21. Further details of the baffle means 20, 21 will be described below.

The main feed advance direction of the chute body 1' extends from the inlet 13 to the outlet 15 along the central axis "x". The movement of the goods 11 through the chute body 1' will be described in more detail below. The vibration generators or exciters may be adjustable in their position relative to the chute body 1' as indicated by the double arrows 22 in FIG. 2. Screws 23 shown only symbolically in FIG. 2 may be used for this purpose.

Due to the forces which are effective across the longitudinal chute axis "x" a helix type revolving motion of the goods to be treated is generated in the flow of the goods 11 in the conveyor chute as shown in FIG. 2 by two arrows 24, 25. The goods being treated are first moved corresponding to the direction of the energizing force along the chute bottom outwardly and upwardly as indicated by the arrow 24. Due to the chute shape and due to the movement of the goods across the longitudinal chute axis x, a zone 26 is formed in the goods which is referred to as the upper reversing zone 26 in which the movement direction of the goods being treated across the main feed advance direction is reversed. Thereafter, the goods are moving substantially in the upper layer of the goods toward the center of the chute or rather downwardly as indicated by the arrow 25. In the lower zone 27 the movement direction is again reversed and the goods now travel again outwardly and upwardly, mainly near the bottom of the chute as indicated by the arrow 24.

Figure 3:
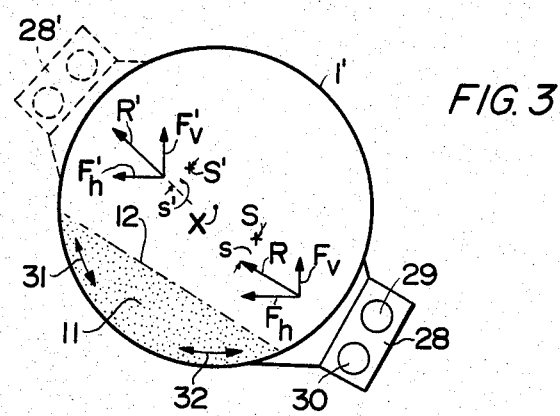
FIG. 3 illustrates the forces effective on a vibration conveyor chute according to the invention.

FIG. 3 illustrates the forces effective on the vibrating conveyor chute according to the invention. The drawing shows the cross-section of a circular chute body 1', equipped with a vibration generator or exciter 28 having position adjustable weights 29, 30. Such weights may also be part of the exciters of FIGS. 1 and 2. The vibration generator 28 produces vibration or force components $F_h$ and $F_v$ in the horizontal and vertical directions respectively. The resultant R of the energizing force components $F_h$ and $F_v$ extends according to the invention with a spacing "s" from a mass center of gravity line S of the conveyor system. The line S extends perpendicularly to the plane of the drawing and in the longitudinal chute direction of the axis "x". The energizing forces extend primarily in a plane extending perpendicularly to the longitudinal chute axis "x". As mentioned above, the generators may also produce force components extending in the longitudinal chute direction or in the main feed advance direction if necessary.

The goods 11 are distributed non-symmetrically in the bottom portion of the chute cross-section as indicated in FIGS. 2 and 3. The surface 12 of the layer of goods 11 extends at a slant relative to the horizontal.

The vibration generator or exciter 28 may be arranged on the lower left side of the chute 1 instead of on the right side, whereby a mirror-symmetrical arrangement would be achieved as compared to the illustrated arrangement of FIG. 3. It is also possible to arrange the vibration exciter 28' on the upper side of the chute as indicated in dashed lines in the upper left hand part of FIG. 3. The vibration exciter 28' produces in this instance horizontal and vertical force components $F'_h$ and $F'_v$. The resultant $R'$ of these energizing force components $F'_h$ and $F'_v$ extends again with a spacing "s'" from the mass center of gravity line $S'$. In connection with the vibration generator arrangement shown in dashed lines again the same or a similar distribution of the goods over the cross-section of the chute is achieved with a slant of the surface 12 of the goods 11 as indicated in FIG. 3.

It should be mentioned here, that the goods being treated in a vibrating conveyor chute generally have only a small influence on the position of the mass center of gravity lines S or $S'$ of the conveyor system. This applies particularly if the filling degree of the vibrating conveyor chute is relatively low.

According to the invention the vibration generators 28 or 28' are arranged as shown schematically in FIG. 3 and the position of these generators 28, 28' is such that the effective direction of the resultant R, $R'$ of the vibration exciting force extends with a spacing "s" or "s'" from a mass center of gravity line S, $S'$ of the conveyor system, said spacing s, s' resulting in a crank action, whereby vibration and rotational movements are imparted simultaneously to the chute and larger $k_v$-values are achieved in the upper movement direction reversing zone 26 of the layer of goods 11 than in the lower zone 27. This means that the goods 11 being treated are exposed to higher vertical accelerations in this upper zone 26 than in the lower zone 27 of the layer of goods 11. Accordingly, the resultant force effective on the goods being treated has a lower angular inclination relative to the horizontal in the lower zone of goods than the resultant of the energizing force R. Thus, in the upper zone 26 the inclination or slant is larger. The simultaneous vibrating and rotational motions of the chute result in an especially advantageous revolving motion or movement of the goods being treated and an intensive and uniform mixing of the goods are achieved. The rotational motions of the chute are indicated by double arrows 31, 32 in FIG. 3.

It has been found to be advantageous to select the $k_v$-values in such a manner that at the upper reversing zone 26 the values are larger than about 2.0 and that at the lower reversing zone 27 the values are larger than about 1.0.

The $k_v$-values at the upper reversal zone 26 or rather, the differences between the $k_v$-values at the upper and lower reversal zone become the larger, the larger the spacings "s" and "s'" of the resultants R, $R'$ of the exciting forces from the mass center of gravity line S, $S'$ becomes. Since such spacing is adjustable according to the invention by conventional means such as the motor control means 10 or by changing the relative position of the exciter, the movement of the goods may be controlled most advantageously.

The adjustment of different effective directions of the exciter force or forces and thus of said spacing s, s' may be realized in different ways by respective structural features. The generators themselves or the connecting elements 23 for connecting these exciters to the conveyor chute may be constructed to be adjustable so that the angle of inclination of the exciters or generators relative to the longitudinal chute axis x may be varied. For this purpose it is possible to use intermediate connector pieces or adaptors of conventional construction. It is also possible to shift the generator and thus the effective direction of the exciter force in parallel to a predetermined, given position or direction.

Where unbalance generators are employed it is possible to adjust the position of the unbalance weights 29, 30. In connection with, for example, autosynchronizing circular exciters it is possible to employ an electrical adjustment. Such circular exciters are electrically controlled by conventional control means 10 in such a manner that the effective direction of the exciter force is varied. Similar mechanically effective adjustment devices are also known in the art, for example, in the form of position adjustable weights. The effective direction of the exciting force may be adjusted by means of these electrical and mechanical adjustment devices even during the operation of the vibrating conveyor chute.

Figure 4:
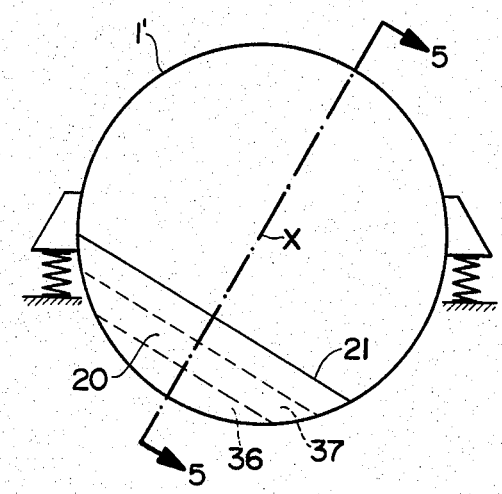
FIG. 4 shows the output end of a tubular vibrating conveyor chute including baffle means.
Figure 5:
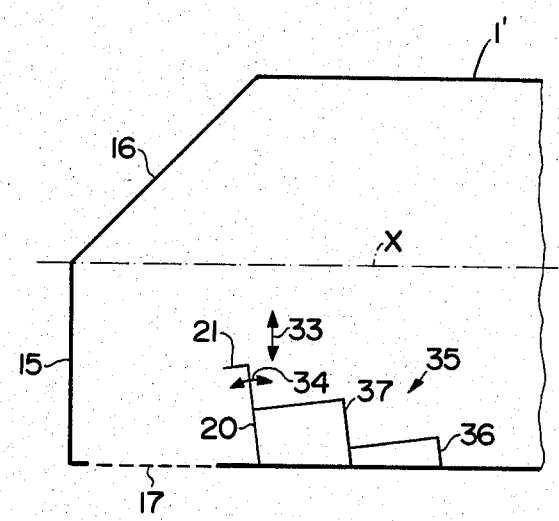
FIG. 5 is a longitudinal sectional view along the section lines 5—5 in FIG. 4 through the output end of a vibrating conveyor chute with a stepped construction of baffle means provided with a flange.

FIG. 4 shows a view of the discharge end of a tubular vibrating conveyor chute body 1'. The above mentioned baffle means 20 is installed near the output 15, 16, 17 of the vibrating conveyor chute body 1'. The baffle means 20 may, for example, have the form of a baffle plate which closes off a portion of the cross-sectional area of the chute. If desired, the baffle plate may extend at a right angle relative to the axis x or it may have a slight inclination in the direction of the feed advance, please see also FIGS. 1 and 5. The baffle means may be installed in a fixed manner or, for example, it may be adjustable in its height or in its angular position as indicated by the arrows 33 and 34 in FIG. 5. The adjustment means are conventional. A motorized adjustment during the operation is also possible if the baffle means is constructed and supported by means known for such a purpose. The position of the baffle means 20 or of its upper edge 21 is adapted to the position or rather the slant shown at 12 in FIGS. 2 and 3 of the flow of goods 11 in the conveyor chute. Thus, the upper edge 21 extends at a slant relative to the horizontal corresponding about to the surface 12 of the flow of goods which establishes itself in the chute. The upper edge may also be curved. The stepwise construction 35 of the baffle means 20 as shown in FIGS. 4 and 5 provides risers 36, 37 facing toward the input 13 or against the feed advance direction in the chute. The baffle means 20 make sure that the distribution of the goods remains about the same over the cross-section of the chute and over the entire length of the chute.

The baffle means 20 shown in FIG. 5 comprises a top edge 21 forming a flange, sill, or collar extending toward the output 15. The flange forms a type of support surface for larger components of the goods being treated which faciliates the discharge of such components over the baffle means 20. A similar effect is achieved by the step type construction 35 of the baffle means 20 which extends opposite to the main feed advance direction. Due to these steps the goods being treated, for example, cast pieces, are gradually and slightly lifted in the feed advance direction of the chute toward the output 15 to thereby facilitate the discharge of the goods, especially of larger components of the goods in the direction 19.

In a vibrating conveyor chute intended for cleaning and cooling of cast components to which molding sand is still adhering, and which is equipped with a screen section 17 at the output for separating the cast components from the sand, the baffle means 20 is arranged upstream of the screen section 17 as shown in FIG. 5. The screen section 17 may form an integral portion of the bottom of the chute. In connection with such a vibrating conveyor chute a conduit 38 with spray heads 39 for spraying the goods being treated, for example with water, is suitably so arranged that substantially the zone of the goods near the upper reversing point 26 may be sprayed, please see FIGS. 1 and 2. Thus, it is possible to substantially avoid the direct spraying of the cast components. In other instances it is possible to achieve a uniform moistening of the goods being treated if the upper zone of the goods is being sprayed.

Figure 6:
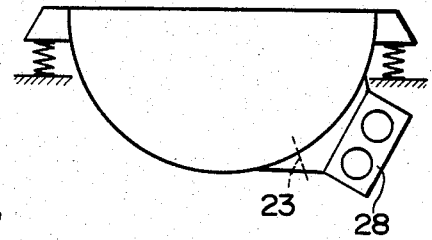
FIG. 6 is a section through a chute having an approximately semi-circular cross-section.
Figure 7:
FIG. 7 shows a section through a chute having two main walls enclosing an angle.
Figure 8:
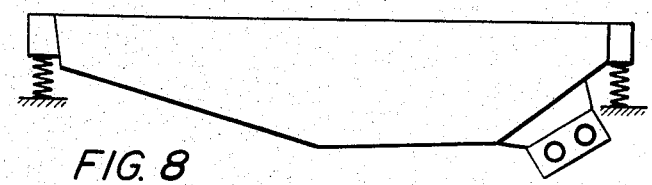
FIG. 8 is a section through a chute with walls forming a polygon.

The vibrating conveyor chute according to the invention may be constructed as a tubular chute as shown, for example, in FIGS. 2 and 3 or it may have a semi-circular cross-section as shown in FIG. 6. However, the chute cross-section may also have a tubor trough shape or the chute cross-section may be of a polygonal configuration as shown in FIG. 8. It is also possible to provide a chute having substantially at least two plane surface members arranged to include an angle relative to each other as shown in FIG. 7. In any of these embodiments it must be assured as described above, that a cross-motion of the goods being treated is possible as indicated by the arrows 24 and 25. The chute may be open or it may be closed.

The vibration generators or exciters may be of various constructions, for example directional exciters, circular exciters with enforced synchronization, magnetic exciters, crank drives and other suitable exciters may be employed, as for example described in said U.S. Pat. No. 3,053,379.

Figure 9:
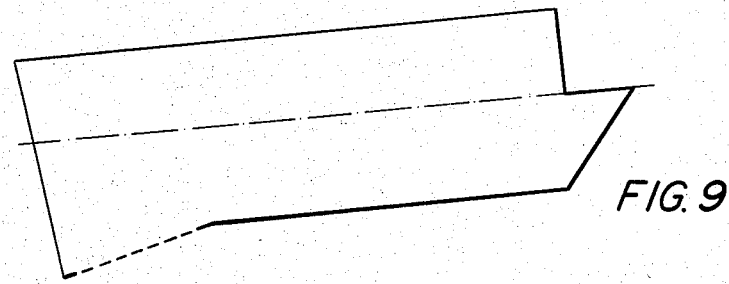
FIGS. 9 & 10 show differently slanting angles for the longitudinal axis of the chute.
Figure 10:

The conveyor chute 1 may be arranged horizontally in the longitudinal direction of the chute axis "x" as shown in FIG. 1. However, the chute may also be arranged with a positive or negative slant relative to the feed advance direction. If the chute is arranged horizontally, it is necessary that the vibration generators produce force or exciter components effective in the main feed advance direction. This is not necessary when the chute falls in the feed advance direction as shown in FIG. 9 because in that case the goods being treated will be transported in the main feed advance direction by the gravity force component. If the chute rises in the feed advance direction as shown in FIG. 10, then the energizing component must be large enough in the rising direction so that the gravity force component is overcome and so that simultaneously a feed advance motion is accomplished in the main feed advance direction.

Although the invention has been described with reference to specific example embodiments, it will be appreciated that it is intended to cover all modifications and equivalents within the scope of the appended claims.

What is claimed is:

1. A method for treating goods in a vibratory chute having a longitudinal axis, a center of gravity line, and a main conveying direction extending substantially in the same direction as said longitudinal axis, comprising the following steps:
    (a) imparting vibrating force components to said chute for applying a force resultant (R, R') to cause said chute to vibrate, said vibrating force components extending substantially perpendicularly to and across said main conveying direction;
    (b) selecting the size of these vibrating force components relative to each other so that an effective direction of said force resultant (R, R') of these force components extends at a definite spacing (s, s') from said center of gravity line (S, S');
    (c) causing a non-symmetric distribution of the goods in the vibrating chute so that the goods in the vibrating chute are moving across the longitudinal axis (x) of the chute from a lower movement reversing zone (27) to an upper movement reversing zone (26) and vice versa; and
    (d) assuring larger $k_v$-values at said upper movement reversing zone than at said lower movement reversing zone, wherein said $k_v$-values are defined as the ratio of a vertical acceleration component of said goods to a gravity vector, whereby the goods are exposed to higher vertical accelerations in said upper movement reversing zone than in said lower movement reversing zone.

2. The method of claim 1, further comprising varying the effective direction of said resultant (R, R') so that said direction is adapted to the operating conditions of said chute.

3. The method of claim 1, wherein said $k_v$-values are selected so that the $k_v$-value at the upper movement reversing zone is larger than two, and so that the $k_v$-value at the lower movement reversing zone is larger than one.

4. The method of claim 1, wherein said chute has a given volume and wherein said goods to be vibrated fill the chute volume within a range of about 10% to 50% (by volume), preferably 20% to 25% (by volume).

5. A vibratable chute for treating goods in the chute having a longitudinal axis (x), a center of gravity line and a main conveying direction all extending in the same direction, comprising longitudinal chute body means having an input and an output, flexible support means operatively connected to said chute body means, vibration generator means operatively connected to said chute body means for imparting vibration causing force components to said chute body means which force components extend substantially perpendicularly to and across said main conveying direction, said vibration generator means having force output means, and means connecting said force output means to said chute body means in positions for simultaneously imparting vibration and rotational movements causing force components to said chute body means due to a resultant force (R, R') of said force components being effective on said chute body means at a definite spacing (s, s') from said center of gravity line resulting in a crank action for simultaneously vibrating and rotationally moving said chute body means to cause a non-symmetric distribution of the goods in the vibrating chute so that the goods in the vibrating chute are moving across the longitudinal axis (x) of the chute from a lower movement reversing zone (27) to an upper movement reversing zone (26) and vice versa, and for assuring larger $k_v$-values at said upper movement reversing zone than at said lower movement reversing zone, wherein said $k_v$-values are defined as the ratio of a vertical acceleration component of said goods to a gravity vector, whereby the goods are exposed to higher vertical accelerations in said upper movement reversing zone than in said lower movement reversing zone.

6. The chute of claim 5, further comprising position adjustable means as part of said vibration generator means for varying the effective direction of said resultant (R, R').

7. The chute of claim 5, wherein said vibration generator means comprise electrical drive motor means and control means operatively connected to said drive motor means for electrically adjusting the effective direction of said resultant.

8. The chute of claim 5, wherein said chute body means comprise baffle means (20) operatively arranged inside said chute near said output of the chute, said baffle means extending at an angle relative to said longitudinal axis.

9. The chute of claim 8, further comprising means for separating different components of said goods, said separating means being located downstream of the baffle means.

10. The chute of claim 8, wherein said baffle means has an upper edge which extends at a slant relative to the horizontal.

11. The chute of claim 8, wherein said baffle means comprise flange means reaching toward said output along said upper edge.

12. The chute of claim 8, wherein said baffle means comprise stair steps including risers facing toward said input.

13. The chute of claim 5, wherein said chute body has a circular, substantially tubular cross-sectional shape.

14. The chute of claim 13, wherein said cross-sectional tubular shape has a radius larger than about 0.5 meter.

15. The chute of claim 5, wherein said chute body has a semicircular cross-sectional shape.

16. The chute of claim 5, wherein said chute body comprises at least two body walls forming two plane surfaces arranged to include an angle with each other.

17. The chute of claim 5, wherein said flexible support means hold said chute body means at an angle relative to the horizontal.

18. The chute of claim 5, further comprising means for spraying goods in the chute with a liquid.

* * * * *